Aug. 30, 1966     A. J. LOTSPIH     3,269,322
SUBMERSIBLE MOTOR AND PUMP
Filed Nov. 30, 1964
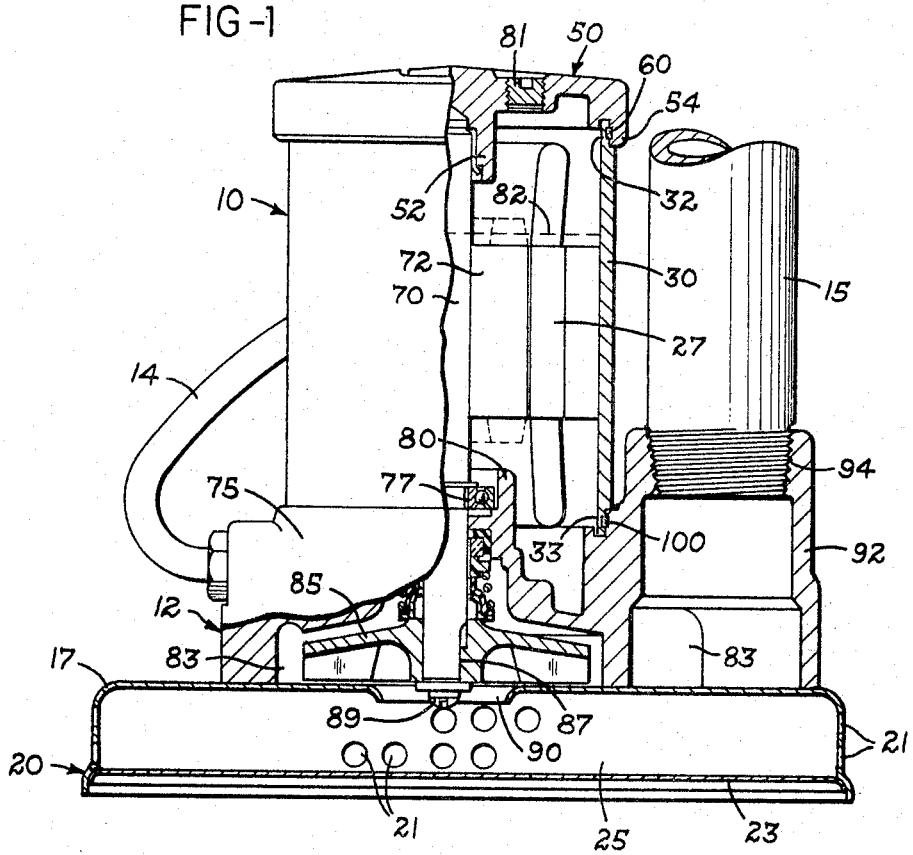
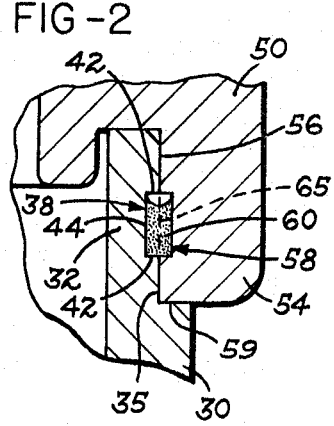
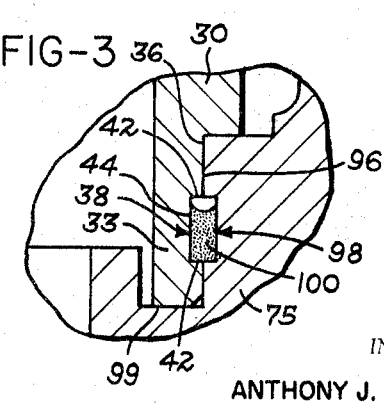
INVENTOR.
ANTHONY J. LOTSPIH
BY
ATTORNEYS _United States Patent Office_

3,269,322
Patented August 30, 1966

3,269,322
SUBMERSIBLE MOTOR AND PUMP
Anthony J. Lotspih, Dayton, Ohio, assignor to The Tait Manufacturing Company, Dayton, Ohio, a corporation of Ohio
Filed Nov. 30, 1964, Ser. No. 414,786
7 Claims. (Cl. 103—87)

This invention relates to submersible motors and pumps and primarily to a motor-pump combination unit which is adapted to be submerged within the liquid supplying the pump and which includes an improved connection for sealing the motor and assembling it to the pump.

The invention has special reference and is particularly adapted to a submersible sump pump for liquid wherein the motor is mounted vertically on top of the pump so that the intake of the pump is spaced toward the bottom of the unit for draining the surrounding liquid to a minimum level. Frequently, the unit may be installed so completely submerged that only the motor leads and a discharge pipe project upward through the surface of the liquid. In such an installation, it is of course necessary that the motor portion of the unit be tightly sealed to prevent liquid from seeping into the motor where it could cause severe damage. The present invention, therefore, is directed to an improved connection which substantially eliminates the chances of liquid seeping into the motor, especially after extended service. It is to be understood, however, that the connection is not limited to a submersible sump pump but is adapted to be used in the construction of any motor combination unit which may be exposed to moisture or submerged in a liquid.

Accordingly, one primary object of the present invention is to provide a submersible motor combination unit wherein the motor includes a closed casing having an improved and inexpensive connection with the components mounted on the ends of the casing so that the motor will be tightly sealed during operation and handling of the unit but can be disassembled for servicing, if necessary.

As another object, the present invention provides an improved connection for a combined motor-pump unit whereby the time required for assembling the motor to the pump to form a tight seal is substantially reduced while the dependability of the sealed connection is substantially increased.

Still another object of the present invention is to provide a submersible motor-pump combination wherein the motor includes an outer shell or casing having a circumferential groove formed within the end portion and adapted to cooperate with a corresponding circumferential groove formed within the component mounted on the end of the casing to define a continuous chamber for receiving a band of cement material which hardens to form a liquid-tight seal between the casing and the component preventing disassembly of the motor from the pump without first shearing the hardened cement material.

It is also an object of the present invention to provide a submersible motor combination unit as outlined above wherein the motor is assembled by an improved connection which is liquid-tight and thereby prevents lubricating fluid within the motor from escaping, and which connection is also economical to form and assemble.

Other objects and advantages of the invention will be apparent from the following description, the accompanying drawing and the appended claims.

In the drawing:

FIG. 1 is an elevational view, partly in axial section, of a motor-pump combination which is assembled according to the connection of the present invention;

FIG. 2 is an enlarged fragmentary view in section of the connection between the motor casing and the upper motor housing showing the novel manner by which the cement material interlocks the two components according to the invention; and FIG. 3 is a view similar to FIG. 2 of the connection between the motor casing and the pump housing formed in accordance with the present invention.

Referring to the drawing, which illustrates a preferred embodiment of the present invention, FIG. 1 shows a submersible sump pump which employs a connection in accordance with the invention and generally includes a motor 10 mounted with a vertical axis of rotation on top of a centrifugal pump 12 from which the motor leads 14 and discharge pipe 15 extend to a suitable electrical supply source and drain line respectively. The combined motor 10 and pump 12 are supported on the top plate 17 of a generally round base 20 having a series of circumferential perforations 21 which serve as a course strainer for the liquid entering the pump. The solid bottom 23 is secured to the base 20 and cooperates therewith to define an inlet chamber 25.

The motor 10 includes a stator 27 which is rigidly secured by a press fit within an outer cylindrical casing 30 having an upper end portion 32 and lower end portion 33 which define an external cylindrical surface 35 and 36 respectively having a formed diameter slightly less than the overall outer diameter of the casing 30. Formed within each of these cylindrical surfaces 35 and 36 is a circumferential groove 38 having a width substantially greater than its depth and which is defined by generally radially extending end surfaces 42 (FIG. 2) joined by a cylindrical base surface 44. Mounted on the upper end portion 32 of the casing 30 is the upper motor housing 50, which includes a centrally spaced hub 52 and an outer flange 54 defining an internal cylindrical surface 56 (FIG. 2) which telescopes over the cylindrical surface 35 on the end portion 32 of the motor casing 30.

Formed within the cylindrical surface 56 of the flange 54 is an internal groove 58 having a cross-sectional configuration generally the same as the external groove 38. As shown in the enlarged view of FIG. 2, when the motor housing 50 is mounted on the motor casing 30 and the flange 54 seats against the shoulder 59, the internal circumferential groove 58 radially matches the external circumferential groove 38 to define a continuous toroidal chamber having an elongated rectangular cross-sectional configuration.

Prior to assembly of the housing 50 on the casing 30, the grooves 38 and 58 are filled separately by a suitable tool with a cement material 60, as indicated by the stippling in FIG. 2 so that after the upper housing 50 is mounted on the casing 30, the cement material will substantially fill the toroidal chamber. Preferably, a suitable epoxy cement having a high shear strength is used for the material 60 so that after the material has hardened into an annular ring, it is necessary to shear the material itself substantially along the shear line 65 in order to remove the housing 50.

The effectiveness of the invention has been demonstrated by comparative impact tests in connection with a unit constructed as described in connection with FIG. 2 and a similar unit of the same construction except that the grooves 38 and 58 were omitted and the cement was applied only to the telescoping cylindrical surfaces corresponding to the surfaces 35 and 56. These tests involved the resistance of the units to separation in response to successive impacts of a predetermined force, and it was found that the upper housing of the unit which did not have the latching grooves could be removed more easily than the other unit by a factor of approximately fifteen. In other words, the provision of the grooves 38 and 58 increased the strength against impact by approximately fifteen times, and it was also found that the unit of the invention had greatly increased sealing dependency against liquid leakage therethrough.

As shown in FIG. 1, rotatably mounted within a sleeve bearing 68 retained within the hub 52 is a motor shaft 70 which carries the rotor 72 and extends downwardly within the pump housing 75. The shaft 70 is rotatably mounted within the housing 75 by a ball bearing 77 which is retained within the hub 80 formed as an integral part of the pump housing. To lubricate the bearing 77 and to conduct the heat from the stator 27 and rotor 72 to the casing 30, a suitable lubricating fluid is placed within the motor 10 through the plug 81 to a level indicated by the line 82.

Spaced within the volute-shaped chamber 83 formed within the housing 75 is a centrifugal impeller 85 which is secured on the bottom end of the motor shaft 70 by a suitable corresponding flat 87 formed on the end of the motor shaft and the screw 89. The centrifugal impeller 85 is adapted to receive liquid through the inlet opening 90 formed within the top plate 17 of the base 20 and to discharge the liquid through the tubular portion 92 and the discharge pipe 15 which is attached to the portion 92 by the threaded connection 94.

As shown by the enlarged FIG. 3, the pump housing 75 has an internal cylindrical surface 96 having an internal circumferential groove 98 formed therein and so spaced from the flat bottom surface 99 as to mate with the external groove 38 formed within the end portion 33 of the motor casing 30 define another toroidal chamber having a configuration the same as the chamber containing the cement 60. Epoxy cement is placed within the corresponding adjacent grooves 38 and 98 immediately prior to the assembly of the motor casing 30 to the pump housing 75 so that the cement will harden in the shape of a cylindrical ring 100 and will substantially fill its receiving chamber in the same manner as the cement ring 60 at the top of the motor casing 30.

By forming the circumferential grooves within the motor casing 30, the upper motor housing 50 and the pump housing 75 so that the grooves cooperate to define in cross-section a cylindrical toroidal chamber having a width substantially greater than the radial depth, it has been found that the bond between the surface defining the grooves and the epoxy cement material as well as the shear strength of the epoxy cement prevent the motor-pump unit from being disassembled without employing a substantial force directed against the housing 50 and the casing 30. In fact, after the cement material hardens, the combined motor-pump is so firmly connected together that the unit can be handled and treated substantially the same as if the unit was all formed with a single piece housing. Furthermore, prior to the time that the hardened cement material is deliberately sheared along the line 65, a perfectly liquid-tight seal is maintained whereby the liquid surrounding the unit is prevented from seeping into the motor and the lubricating and coolant fluid within the motor is prevented from seeping out of the unit.

One of the primary advantages of the joint formed in accordance with the present invention is the substantial reduction in time which is required to assemble the unit. This time savings, of course, is especially significant with high volume production of the units. Thus, with the aid of a simple spreading tool, the cement material in a plastic state can be quickly applied to the surfaces defining the grooves after which the components are pressed together. The cement will then harden to provide the rigid liquid-tight connection which cooperates with the suitable shaft seal 102 to form a completely sealed unit. As a result of the increased dependability of the connection according to the invention, it has been found that the overall dependability of the unit is substantially increased and thus, rarely is it necessary to disassemble the motor for servicing. Thus, it is unnecessary to provide means for easily disassembling the motor such as a series of bolts which are commonly employed to clamp the components mounted on the ends of the motor casing against suitable gaskets spaced between the components and the case.

It is to be understood, however, that while the connection formed in accordance with the present invention is ideally suited for and is illustrated on a submersible motor-pump unit, the connection is also adapted as a simplified means of assembling the end housings to a motor casing whenever a sealed-in motor is required for submerging or exposure to a liquid.

While the form of apparatus herein described constitutes a preferred embodiment of the invention, it is to be understood that the invention is limited to this precise from of apparatus, and that changes may be made therein without departing from the scope of the invention which is defined in the appended claims.

What is claimed is:

1. A sealed motor-pump assembly adapted to be submerged within a liquid which supplies the pump, comprising a motor having a rotor and shaft and a cylindrical outer casing, a shaft support housing mounted on one end of said casing and including a cylindrical flange spaced adjacent an end portion of said casing, a pump housing connected to the opposite end of said casing and having an impeller rotatably mounted therein on said shaft, means defining a circumferential groove formed within the cylindrical surface of said end portion of said casing, means defining a corresponding circumferential groove formed within the cylindrical surface of said flange, seat means for spacing said circumferential grooves in radially matching relation to define a torodial chamber, and a hardenable cement material within said chamber substantially filling said grooves to lock said shaft support housing firmly to said casing and to form a liquid-tight seal therewith.

2. A sealed motor-pump assembly adapted to be submerged within the liquid which supplies the pump, comprising a motor having a rotor and shaft and a cylindrical outer casing, a shaft support housing mounted on one end of said casing, a pump housing mounted on the opposite end of said casing and having an impeller rotatably mounted therein on said shaft, said pump housing having a cylindrical surface for engaging the opposite end portion of said casing, a circumferential groove formed within the cylindrical surface of both said end portions of said casing, a corresponding circumferential groove formed within the cylindrical surfaces of both said flange and said pump housing, means for spacing said circumferential grooves on said casing in radially matching relation with said corresponding grooves on said flange and said pump housing to define a toroidal chamber spaced on each end of said casing, and a hardenable cement material within said chambers substantially filling said grooves to lock said shaft support housing and said pump housing firmly to said casing and to form a liquid-tight seal therewith.

3. A sealed motor-pump assembly adapted to be submerged within the liquid which supplies the pump, comprising a motor having a rotor and shaft assembly and a tubular outer casing, a shaft support housing mounted on one end of said casing and including a continuous flange firmly surrounding an end portion of said casing, a pump housing connected to the opposite end of said casing, an external groove formed around the outer surface of said end portion of said casing, a corresponding internal groove formed around the internal surface of said flange, seat means for spacing said internal groove in radially matching relation with said external groove to define to toroidal chamber, and a hardenable cement material within said chamber substantially filling said grooves to lock said shaft support housing firmly to said casing and to form a liquid-tight seal therewith.

4. An improved liquid-tight connection adapted for use in a submersible motor unit having a cylindrical outer casing and shaft support means mounted on each end of said casing, said connection comprising means defining a circumferential groove formed within an end portion of said casing, a corresponding circumferential groove formed within said shaft support means corresponding to said end portion, means for spacing said circumferential grooves in radially matching relation to define a toroidal chamber, and hardenable cement material within said chamber substantially filling said grooves to lock said shaft support means firmly to said casing and to form a liquid-tight seal therewith.

5. An improved connection as defined by claim 5 wherein said hardenable cement material comprises an epoxy resin.

6. A sealed motor-pump assembly adapted to be submerged within a liquid which supplies the pump, comprising a motor and a shaft and a cylindrical outer casing, a shaft support housing mounted on one end of said casing and including a cylindrical flange spaced adjacent an end portion of said casing, a pump housing connected to the opposite end of said casing and having an impeller rotatably mounted therein on said shaft, means defining a circumferential groove formed within the cylindrical surface of said end portion of said casing, said groove having generally radial side walls joined by a cylindrical base, a corresponding circumferential groove formed within the cylindrical surface of said flange, seat means for spacing said circumferential grooves in radially matching relation to define a cylindrical toroidal chamber having a length substantially greater than its depth, and a hardenable cement material within said chamber substantially filling said grooves to lock said shaft support housing firmly to said casing and to form a liquid-tight seal therewith.

7. A sealed motor-pump assembly adapted to be submerged within the liquid which supplies the pump, comprising a motor having a rotor and shaft and a cylindrical outer casing, a shaft support housing mounted on one end of said casing and including a cylindrical flange spaced over one end portion of said casing, a pump housing mounted on the opposite end of said casing and having an impeller rotatably mounted therein on said shaft, said pump housing having a cylindrical surface for mounting over the opposite end portion of said casing, means defining an external circumferential groove within the cylindrical outer surface of both said end portions of said casing, each said groove having generally radial side walls joined by a cylindrical base, a corresponding internal circumferential groove formed within the cylindrical surfaces of both said flange and said pump housing, seat means for spacing said circumferential grooves on said casing in radially matching relation with said corresponding grooves on said flange and said pump housing to define a cylindrical toroidal chamber spaced on each end of said casing and with said chambers having a length substantially greater than its depth and a hardenable cement material including an epoxy resin within said chambers and substantially filling said grooves to lock said shaft support housing and said pump housing firmly to said casing and to form a liquid-tight seal therewith.

References Cited by the Examiner
UNITED STATES PATENTS

| 2,718,193 | 9/1955 | Zimsky | 103—87 |
| 3,188,968 | 6/1965 | McMahan | 310—87 X |

ROBERT M. WALKER, *Primary Examiner*.